(12) United States Patent
Ishii et al.

(10) Patent No.: US 11,231,529 B2
(45) Date of Patent: Jan. 25, 2022

(54) LIGHT SOURCE FOR PROJECTION DISPLAY

(71) Applicants: Fusao Ishii, Pittsburg, PA (US); NTT DOCOMO, Inc., Tokyo (JP)

(72) Inventors: Fusao Ishii, Pittsburg, PA (US); Mikiko Nakanishi, Tokyo (JP); Kazuhiko Takahashi, Tokyo (JP); Yuji Aburakawa, Tokyo (JP)

(73) Assignees: FUSHO ISHII, Pittsburgh, PA (US); NTT DOCOMO, INC., Tokyo (JP)

( * ) Notice: Subject to any disclaimer, the term of this patent is extended or adjusted under 35 U.S.C. 154(b) by 152 days.

(21) Appl. No.: 16/252,627

(22) Filed: Jan. 19, 2019

(65) Prior Publication Data
US 2019/0227204 A1    Jul. 25, 2019

Related U.S. Application Data

(60) Provisional application No. 62/619,776, filed on Jan. 20, 2018.

(51) Int. Cl.
*G02B 5/02* (2006.01)
*G02B 27/30* (2006.01)
*G02B 5/32* (2006.01)

(52) U.S. Cl.
CPC .............. *G02B 5/0252* (2013.01); *G02B 5/32* (2013.01); *G02B 27/30* (2013.01)

(58) Field of Classification Search
CPC .......... G02B 5/0252; G02B 5/18; G02B 5/32; G02B 27/30; G02B 27/1006; G02B 27/1086; G03B 21/142; G03B 21/2013; G03B 21/208; G01N 15/0205; G01N 15/0227; G01N 21/453; G01N 21/4788; G01N 21/8806; G01N 2015/0233; G01N 2021/8812; F21V 5/002
See application file for complete search history.

(56) References Cited

U.S. PATENT DOCUMENTS

2003/0067774 A1*  4/2003  Lizotte ..................... G02B 5/32
                                                  362/236
2007/0216979 A1*  9/2007  Li ............................. G02B 5/32
                                                   359/15

\* cited by examiner

*Primary Examiner* — Mustak Choudhury
(74) *Attorney, Agent, or Firm* — Bo-In Lin

(57) ABSTRACT

A compact integrator of light beams is disclosed using a diffractive optical element to integrate multiple beams into a single beam regardless of wavelength or polarization.

10 Claims, 18 Drawing Sheets

LIGHT SOURCE FOR PROJECTION DISPLAY

CROSS REFERENCE TO RELATED APPLICATIONS

This application is a Non-Provisional Application and claim the Priority Date of a previously filed Provisional Application 62/619,776 filed on Jan. 20, 2018. Provisional Application 62/619,776 is a Continuation in Part (CIP) application of Patent Application PCT/US17/38523, which is a Non-Provisional filing of a Provisional Application 62/493,077 filed on Jun. 21, 2016.

TECHNICAL FIELD

This invention relates to an illumination system for a projection display system integrating multiple light beams into a single beam with narrower bandwidth. More particularly, this invention relates to a very cost-effective and easy to make light source using diffractive optical element or holographic optical element to achieve a low Etendue light source.

BACKGROUND OF THE INVENTION

In recent years projection displays are developed to create a contact display such as wearable display, an eyeglass display for virtual-reality or augmented reality. However light sources using LED or laser diodes which combine multiple color beams into a single beam requires a very complicated system and very high precision of alignment with time consuming adjustment. Some prior arts are shown in FIG. 1 through FIG. 6.

FIG. 1 is an example of light source combining three laser beams into a single beam. Specifically, FIG. 1 shows an integrator (or combiner) of light beams using a mirror (1007) and dichroic mirrors (1008 and 1009) which reflect only a selected wavelength and polarization. A Green laser diode or LED (1001) is used and the emitted light beam (1004) is collimated by a collimation lens (1005) to form a parallel beam (1006) and the beam is reflected by a mirror (1007) toward the next dichroic mirror (1008) which is a low pass filter and reflects only "Blue" and higher frequency light. The green light passes through the dichroic mirror (1008). The Blue laser diode (1002) emits light and it is collimated to a parallel beam (1009) and reflected to the right by the dichroic mirror (1008) which reflects only Blue or higher frequency light. A Red laser light emits light and the light is collimated and reflected by the dichroic mirror (1010) which is a high pass filter and reflects only Red or lower frequency light and passes all higher frequency light such as green and blue. This is how the system works, but this method does not combine two light beams with same color and polarization. Therefore, this method can combine light beams with different colors or different polarization of beams and cannot combine light beams with same color and same polarization. Therefore not only complex system but also maximum power is limited.

Another example of conventional system is shown in FIG. 2 that is a different implementation of FIG. 1 having a different size to overcome the difficulty of fabrication in a small form factor of FIG. 1. Specifically, when the size of system becomes smaller, it is difficult to assemble in a small area as that shown FIG. 1 due to the size of laser diodes and therefore, a structure shown in FIG. 2 is commonly implemented.

FIG. 3 shows another example of multiple beam integrator using PLC (Planar Lightwave Circuit) which was developed as a multiplexer for data transfer system using optical fibers. In recent years, this method is attempted to combine multiple color laser beams for projection displays. However this method requires single mode laser beams which are quite expensive as well as power is very limited. Single mode laser is a laser beam having a narrow band single frequency. The system works well if the difference of frequency between beams is small and each beam contains only a single frequency (so called "single-mode laser"). This system does not work efficiently if the beam contains multiple frequencies (so called "multi-mode laser"). Single-mode laser diodes are usually lower power compared with multi-mode lasers. To obtain high power of laser, this system is not suitable. Therefore, this system is not applicable to a multi-mode laser having multiple frequencies in a beam. Another difficulty of this system is the alignment accuracy of laser beam is very tight (usually sub-microns) and fabrication is quite difficult without an expensive alignment system. Therefore, the alignment of laser diode and optical fiber requires sub-microns accuracy and become very expensive to implement.

Another example of prior arts is shown in FIG. 4, which uses optical fibers to combine multiple beams in to a single beam. The light beams from laser diodes (4001) are aligned to ferules of optical fibers (4003) and lead to optical fibers (4004). The fibers are combined into a single optical fiber (4006) using Y-shape optical fibers (4005). This structure causes reflection at the Y-shaped combiner (4006) and loses efficiency substantially as much as 50%. This method also requires high precision alignment as submicron accuracy and also high loss of energy at the optical fiber combiner.

Although FIG. 1 through FIG. 4 enable low Etendue (Etendue is defined as the light emitting area multiplied by the divergent angle of beam) which means very narrow beam and is necessary for projection display such as a laser beam scanner. FIG. 5 and FIG. 6 show examples with relatively high Etendue which can be used for projection displays using a 2 dimensional SLM (Spatial Light Modulator), such as LCD and DMD (Digital Micromirror Device).

FIG. 5 shows another conventional light source used in a commercially available projector using multiple laser diodes whose beams are combined with mirrors into a single location, but with multiple beams (not a single beam). Each laser beam has low Etendue, but the combined beams form large Etendue which reduces the efficiency of light collection.

FIG. 6 shows another conventional system includes light source used in a commercially available projector that includes multiple LEDs (11B, 11G, 11R). The light from these LEDs are condensed by the lens (14) and homogenized by the homogenizer (15) and lead to the display device (17). LED has large light emitting area and large divergent angle, then the Etendue of each LED is very high. Due to the high Etendue, high brightness is difficult to achieve There is a need for a light source which enables low Etendue, easy to fabricate and low cost with lower alignment accuracy of fabrication. This invention discloses a low Etendue light source which integrates multiple beams into a single beam regardless of the wave-length and polarization of light beams using HOE (Holographic Optical Element) or DOE (Diffractive Optical Element).

SUMMARY OF THE INVENTION

One of the objectives of this invention is to provide a compact light source for a projection display shown as in FIG. 7, wherein multiple laser beams (7003) are combined with a holographic optical element (hereafter HOE, 7004) into a single beam (7005). 7001 is a laser diode and 7002 is a collimation lens to collimate a diverging light into a parallel beam (7003).

It is also an aspect of this invention that implements a laser diode 8001 that emits a light beam and the light beam is directed to the HOE/DOE having a periodical structure of varying refractive index in a slant angle (θ, 8013). The Incident beam is diffracted toward the normal direction (8006). This structure enables to combine multiple light beams even if two beams have same wavelength and same polarization, which is a significant advantage compared with the other methods among the prior arts.

The structure of HOE or DOE is depicted in FIG. 9. The bright area (9001) has higher refractive index and the dark area (9002) has lower refractive index. The stripes are tilted from the normal direction of the substrate surface and the pitch of stripes is shown as (9003) and repeat many times periodically. The incident light (9004) is reflected as if a normal mirror reflection by the tilted stripes (9001 and 9002) toward (9005). The tilt angle of stripes can be chosen arbitrarily and not restricted as a regular mirror.

Specifically, in one of the preferred embodiments, this invention discloses an integrator of light beams that comprises multiple light emitting sources each emitting a light beam to a diffractive optical element (DOE) to diffract each of the beams to a targeted direction, and wherein diffractive angles at local peaks of the DOE of each of the light beams do not coincide with incident angles of other beams. In another preferred embodiment, the light beams comprise blue, green and red light beams. In a different embodiment, the DOEs from the incident beams are superimposed in a single layer. In another preferred embodiment, the DOEs from the incident beams are superimposed in a single layer. In another preferred embodiment, the layers containing DOE are laminated into a single plate. In another embodiment, the DOE is reflective. In another embodiment, the direction of the stripes of DOE is a free-form arbitrary function so that non-collimated light beams are integrated. In another embodiment, the light emitting device is one of laser, LED and OLED. In another embodiment, the DOE is made of holographic optical element and stripes in the element are made of photopolymer. In another embodiment, the DOE is made of a relief type diffractive optical element. In another embodiment, the DOE is made of substantially transparent multi-layers having at least two different materials whose refractive indices are different. In another embodiment, the layers comprise at least one repeating pattern with material having a different refractive index from substrate, so that said layer diffracts incident light.

It is another preferred embodiment of this invention that discloses a light source that comprises at least one light emitting device and incident light, a collimation lens, a DOE, and a slit wherein an emitted light beam from said light emitting devices is collimated with the collimation lens and lead to the DOE and the diffracted light is lead to the slit, so that the outgoing light from said slit has substantially narrower bandwidth of light spectrum.

DETAIL DESCRIPTIONS OF THE PREFERRED EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced or designed without these specific details. In other instances, well-known methods, procedures, components, and circuits have not been described in detail so as not to unnecessarily obscure aspects of the embodiments.

The technical solution of the present disclosure will be clearly and completely described in the following with reference to the accompanying drawings. It is obvious that the embodiments to be described are examples and only a part rather than all of the embodiments of the present disclosure. All other embodiments obtained by persons skilled in the art based on the described embodiments of the present disclosure shall fall within the protection scope of the present disclosure.

Detail descriptions of various embodiments of this invention are shown in FIG. 7, FIG. 17, FIG. 18, FIG. 19 and FIG. 20, although not limited to these examples. In this invention, hereafter both holographic optical element (HOE) and diffractive optical element (DOE) will be referred to as DOE.

Figure 1:
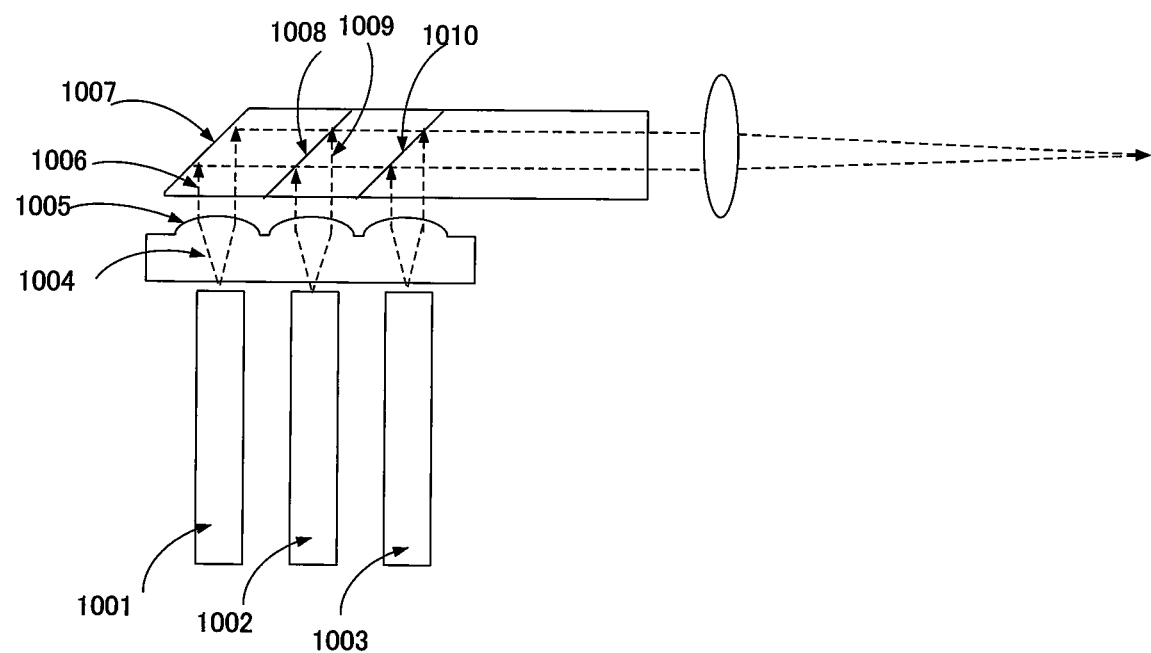
FIG. 1 is an example of a conventional system that includes an integrator (or combiner) of light beams using a mirror and dichroic mirrors which reflect only a selected wavelength and polarization.
Figure 2:
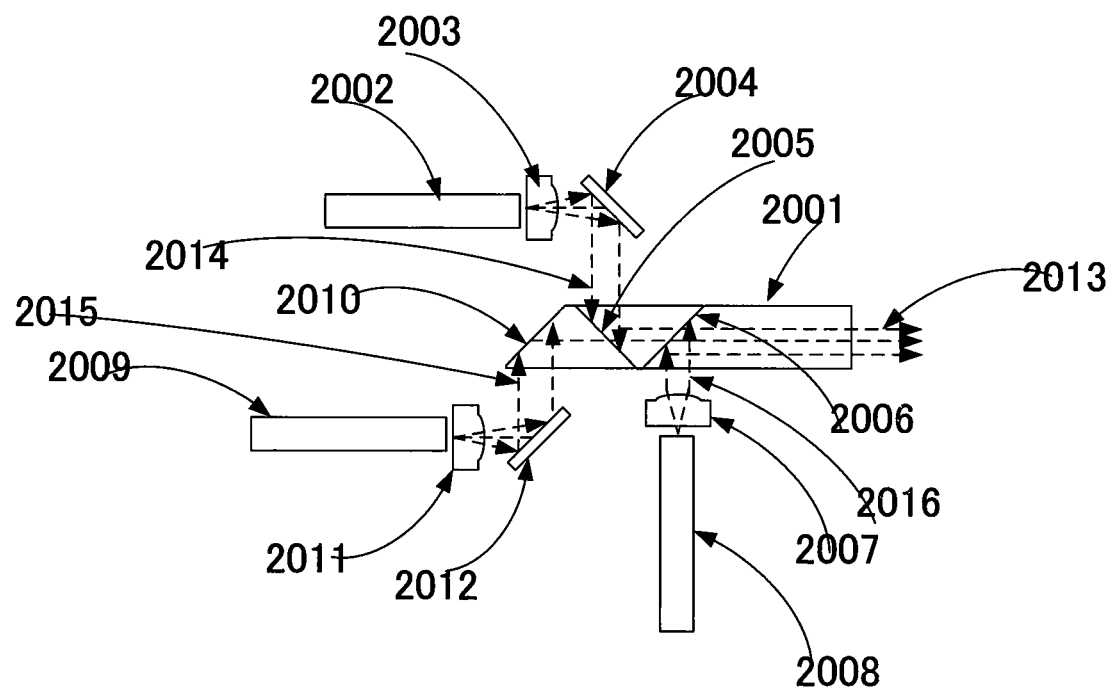
FIG. 2 shows another implementation of the system of FIG. 1 but with different size.
Figure 3:
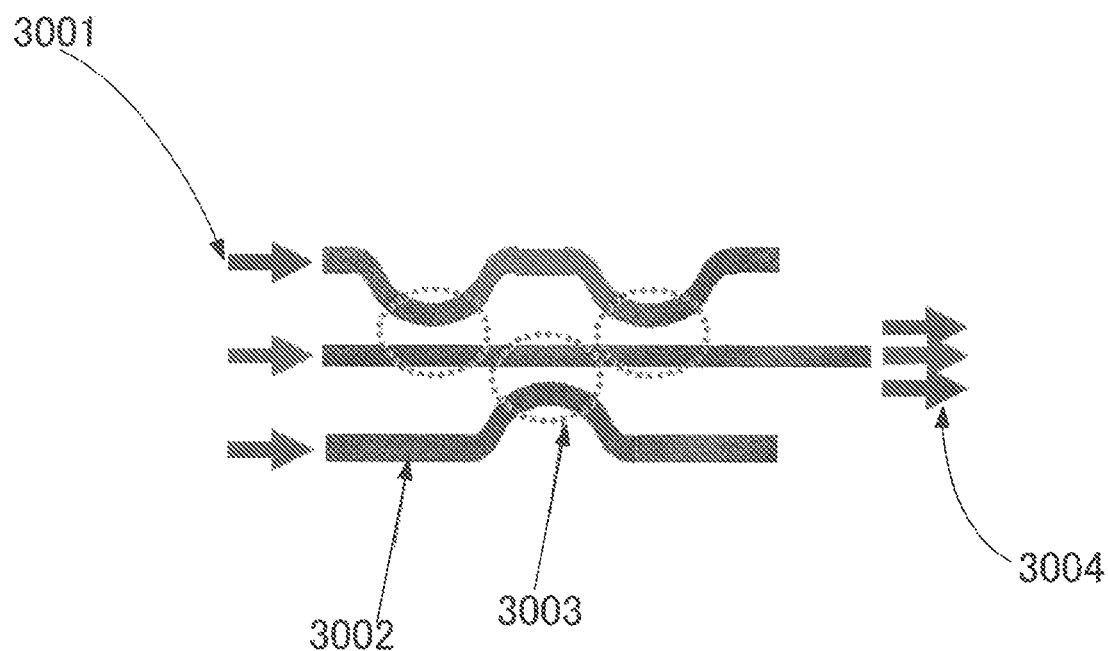
FIG. 3 shows another conventional way, commonly known as Planar Lightwave Circuit (PLC), to implement an integrator of multiple color of laser beams.
Figure 4:
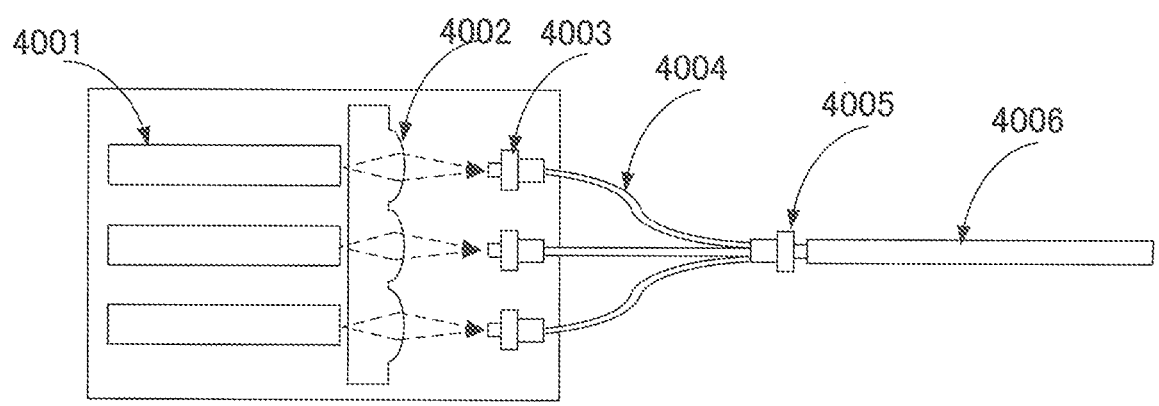
FIG. 4 shows another conventional structure of light source that implements optical fibers with reflection at the Y-shaped combiner (4006) and loses efficiency substantially as much as 50%.
Figure 5:
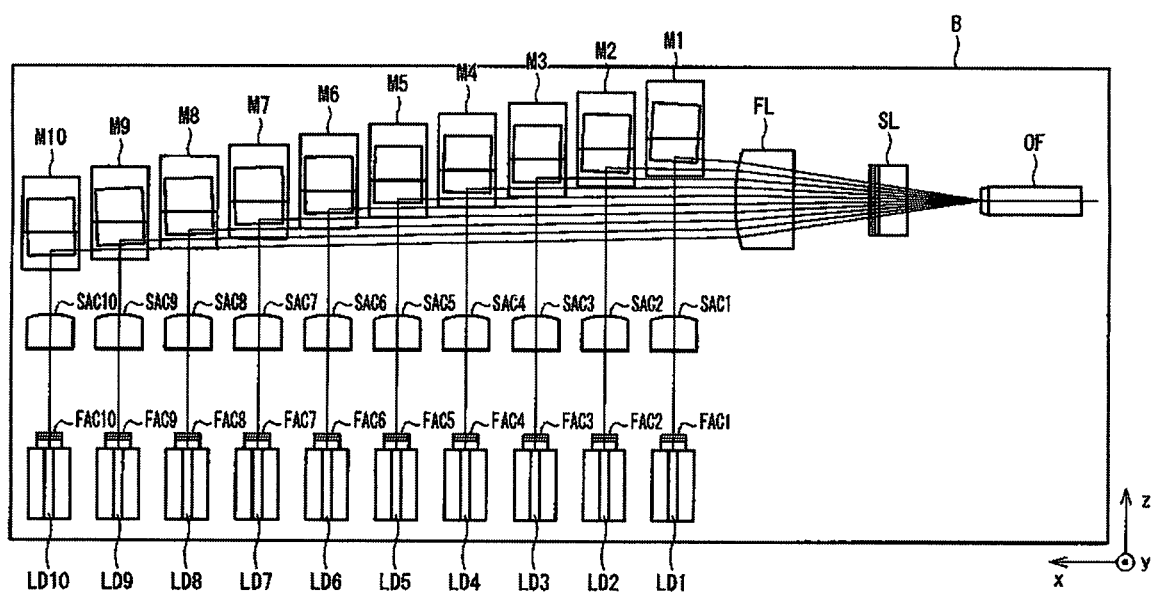
FIG. 5 shows an exemplary light source for a conventional projection display using multiple laser diodes wherein each of laser beam is narrow, but the combined beam has a large divergent angle.
Figure 6:
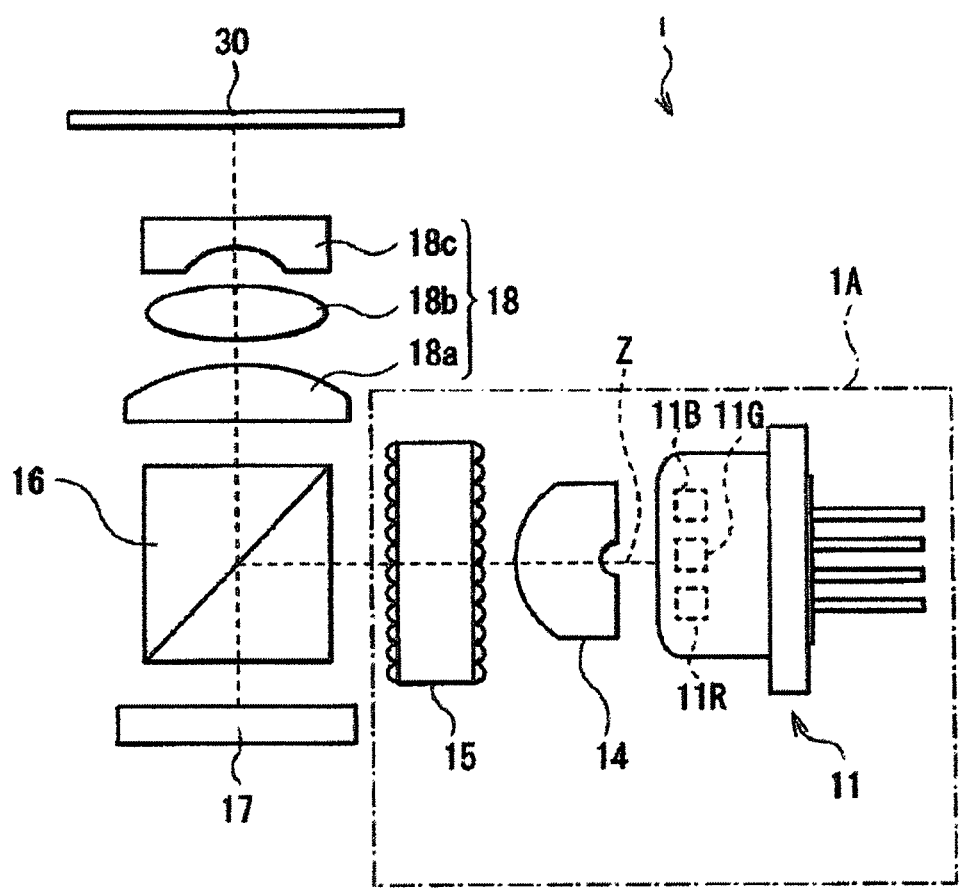
FIG. 6 shows another conventional system with LED light sources combined into a single but large beam to illuminate a projection display device that has large Etendue and the efficiency of light utilization is limited because of large Etendue.
Figure 7:
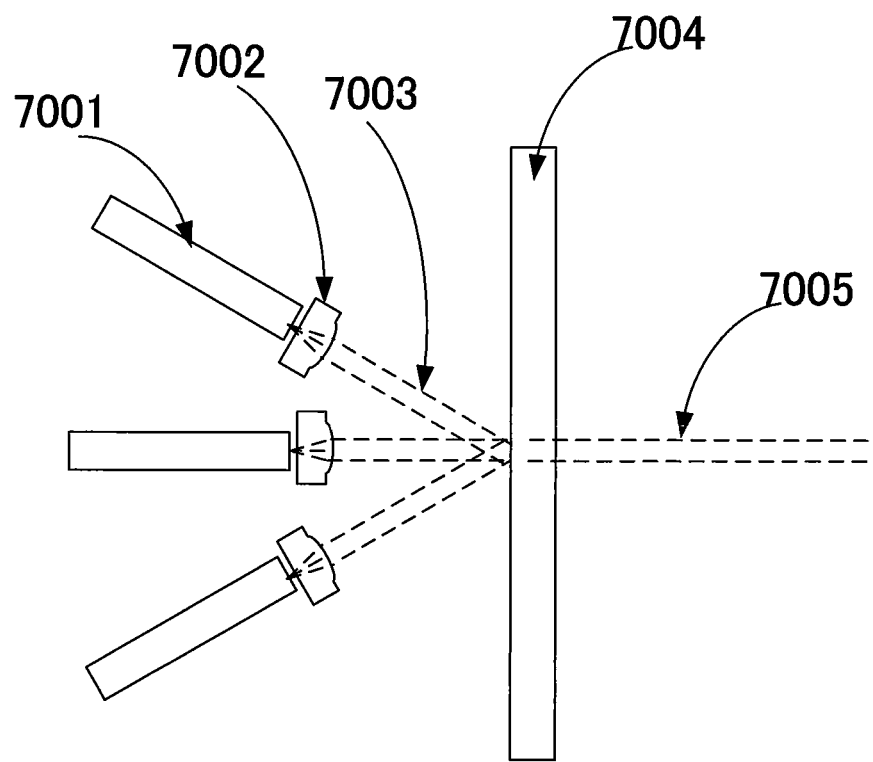
FIG. 7 shows an exemplary embodiment of this invention that enables the integration of multiple collimated beams into a single collimated beam.

FIG. 7 shows an exemplary embodiment of this invention that enables the integration of multiple collimated beams into a single collimated beam. Collimated multiple laser beams (7003) are lead to a HOE or DOE (7004) that is used to combine light beams (7003) from different incident angles (7004). A solid state light source 7001, such as laser diode and LED, and a collimation lens (7002) collimates the beam into a parallel beam (7003) to a HOE/DOE (7004). Each laser beam is diffracted to the normal direction (7005) so that multiple laser beams are integrated into a single beam, wherein HOE/DOE is arranged to bend each incident beam toward the normal direction. HOE/DOE can be multiple layers or a superimposed single layer. Multiple beams are integrated into a single beam (7005) with low Etendue.

Figure 8:
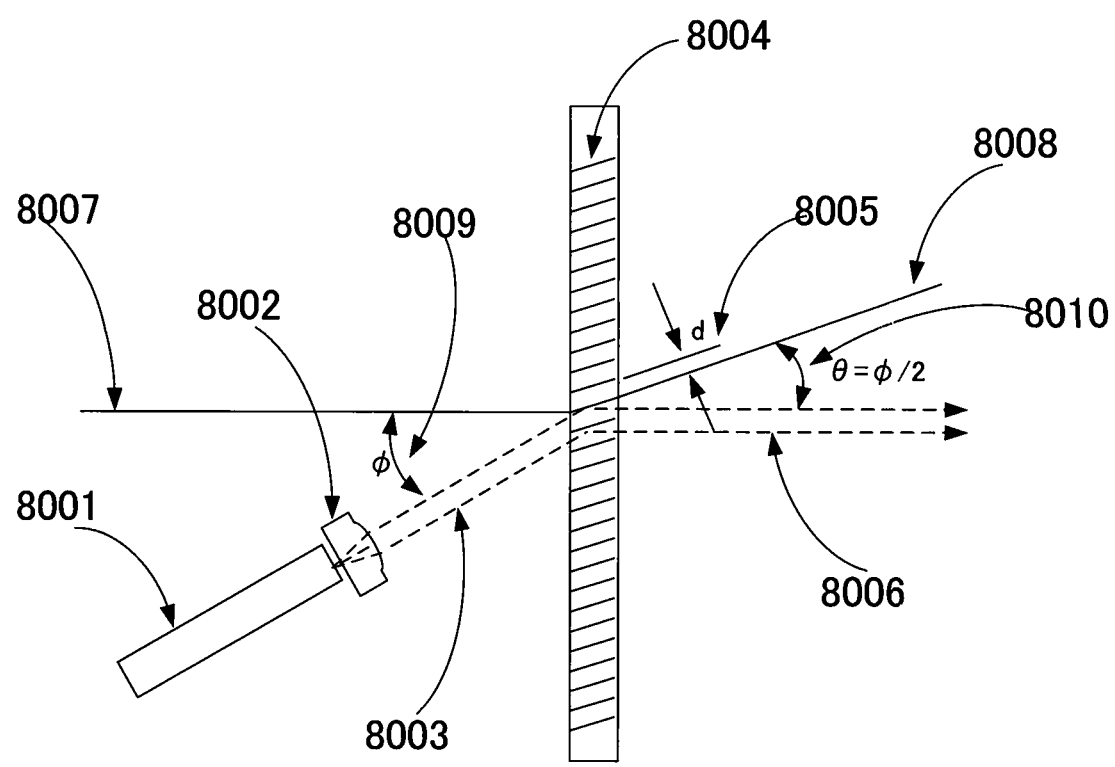
FIG. 8 illustrates trajectory of the light beam that is bent in the direction by the HOE/DOE having a periodical structure of varying refractive index in a slant angle of this invention.

FIG. 8 shows how this system works. A laser diode (8001) emits a light beam which is divergent from an area as small as sub microns. The divergent beam is collimated to a parallel beam (8003) and lead to a HOE or DOE (8004) wherein the refractive index of HOE varies periodically with aslant angle (theta, θ, 8010) and the pitch is shown as d (8005). The HOE material is transparent so that light is not absorbed, although the refractive index varies periodically to bend the direction of incident light beam (8003) entering the HOE in the angle of phai, φ (8009). The incident beam (8003) hits the stripe of HOE (8004) which is arranged in the slant angle of θ (theta, 8010) and reflect the incident beam toward the normal direction to the surface (8006). The stripe of HOE acts as if a micro-mirror which reflects a beam as a normal mirror reflection, when the length and width are large enough, although if the length or width is small, there is some deviation from this rule. The pitch of stripe shown as "d" (8005) must be chosen so that only specific light wave-length will be diffracted using so called Bragg's law:

$$2*d*\sin(\theta)=n\lambda$$

where λ is the wavelength of incident light and n is an integer, 0, +/−1, +/−2. As shown later, a light beam with a different wavelength or different angle will not be diffracted by these stripes, if the parameters are chosen suitably. This structure enables to combine multiple light beams even if two beams have same wavelength and same polarization, which is a significant advantage compared with the other methods among the prior arts.

Figure 9:
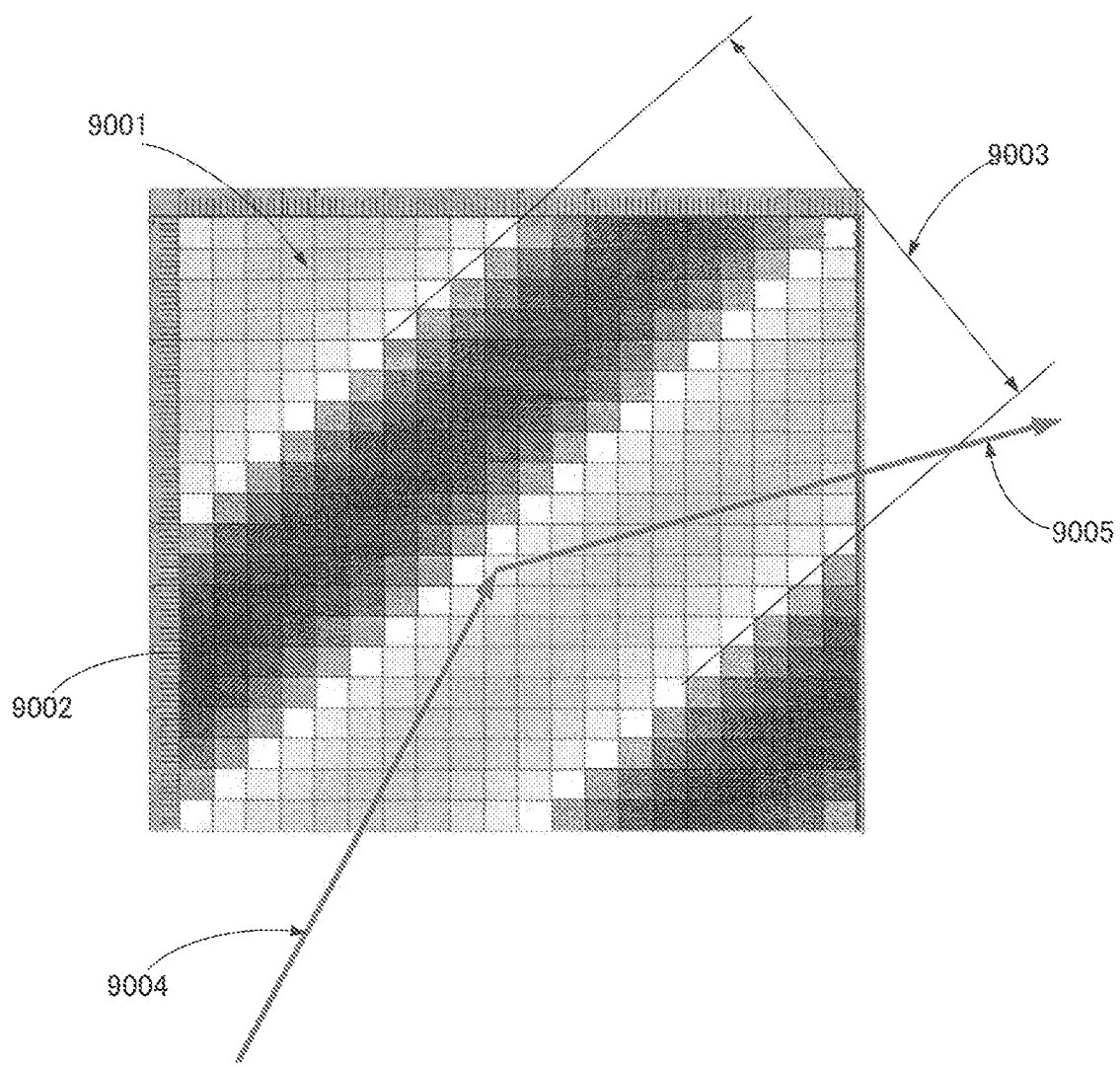
FIG. 9 illustrates the structure of HOE/DOE that includes a high refractive index area and a low refractive area with these areas arranged in a slant direction having a pitch to diffract an incident beam.

The structure of HOE or DOE is depicted in FIG. 9. The bright area (9001) has higher refractive index and the dark area (9002) has lower refractive index. The stripes are tilted from the normal direction of the substrate surface and the pitch of stripes is shown as (9003) and repeat many times periodically. The incident light (9004) is reflected as if a normal mirror reflection by the tilted stripes (9001 and 9002) toward (9005). The tilt angle of stripes can be chosen arbitrarily and not restricted as a regular mirror.

The structure of HOE or DOE is depicted in FIG. 9. The bright area (9001) has higher refractive index and the dark area (9002) has lower refractive index. The stripes are tilted from the normal direction of the substrate surface and the pitch of stripes is shown as (9003) and repeat many times periodically. The incident light (9004) is reflected as if a normal mirror reflection by the tilted stripes (9001 and 9002) toward a light path 9005. The tilt angle of stripes can be chosen arbitrarily and not restricted as a regular mirror.

Figure 10:
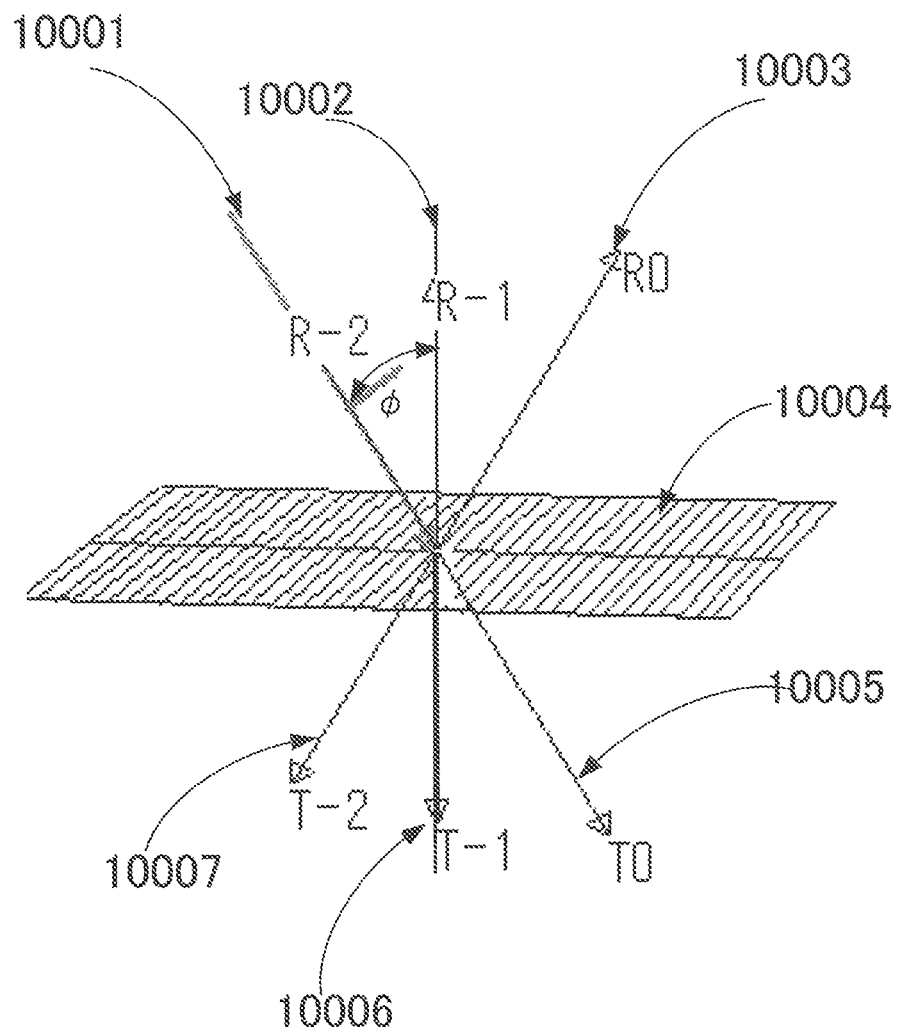
FIG. 10 illustrates the directions of diffracted lights of this invention.

FIG. 10 illustrates the directions of diffracted lights (10001) Is an incident light. R0 is the normal reflection angle and called $0^{th}$ order diffraction. R-1 and R-2 are −1st and $-2^{nd}$ order of diffraction angles. The orders correspond to the value of "n" in Bragg's law, $2*d*\sin(\theta)=n\lambda$. R stands for Reflection and T stands for Transmissive. Positive $1^{st}$ order does not exist, because the value of sin (θ) becomes larger than 1.

Figure 11:
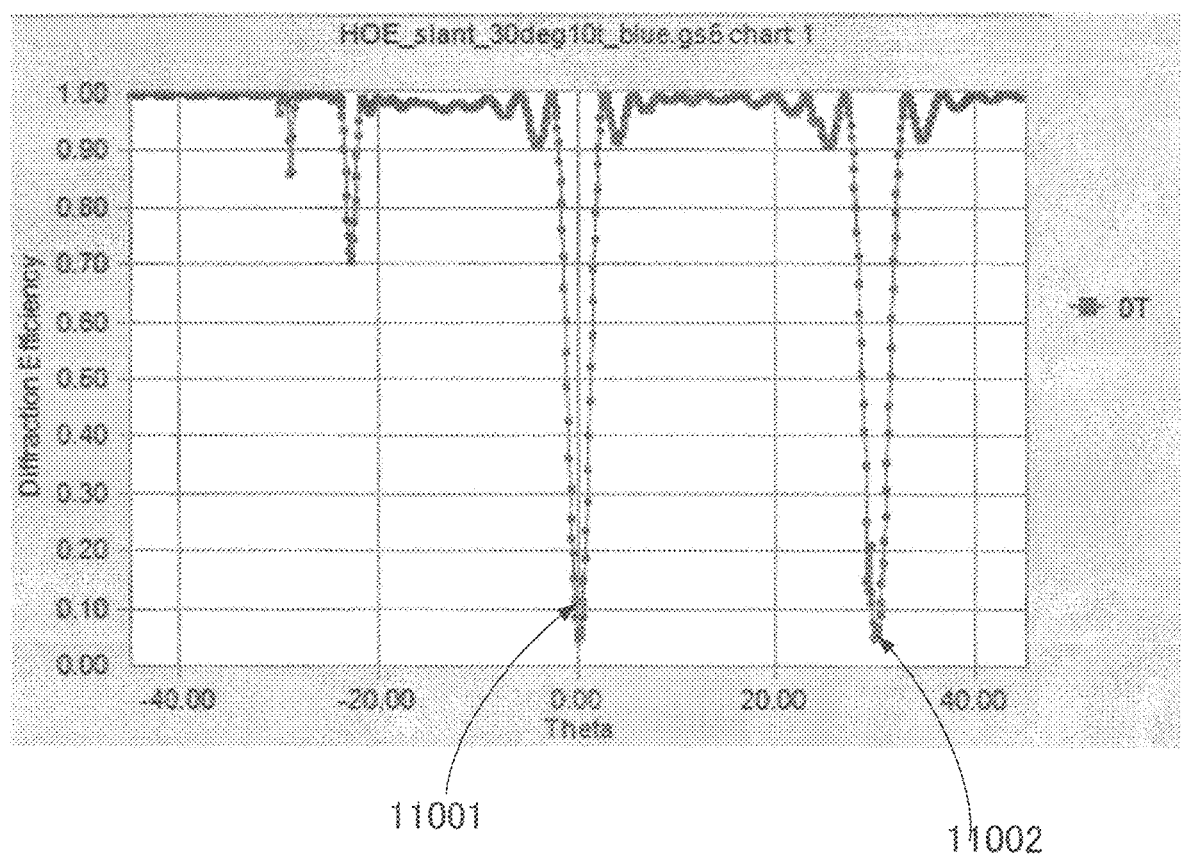
FIG. 11 shows the diffraction efficiency of 0 T ($0^{th}$ order of transmissive light) of the example of FIG. 10 with the angles and the energy diffracted are shown in FIG. 12.

FIG. 11 shows the diffraction efficiency of 0 T ($0^{th}$ order of transmissive light) of the example of FIG. 10. The vertical axis shows Diffraction Efficiency meaning how much percentage of incident light goes through the transmitted direction without diffraction. The Bragg's law represents infinitely long and deep structure and not necessarily represent a finite size structure. FIG. 11 shows a result of numerical simulation using finite depth and practical value of refractive index, which is not necessarily same as the result of Bragg's law. The sharp drops marked as 11001 and 11002 indicates that if the incident angle of beam is 0 degrees or 30 degrees, the light is highly diffracted and light less than 5% will be transmitted through the HOE/DOE and over 95% of light will be diffracted to certain angles. These angles and the energy diffracted are shown in FIG. 12.

Figure 12:
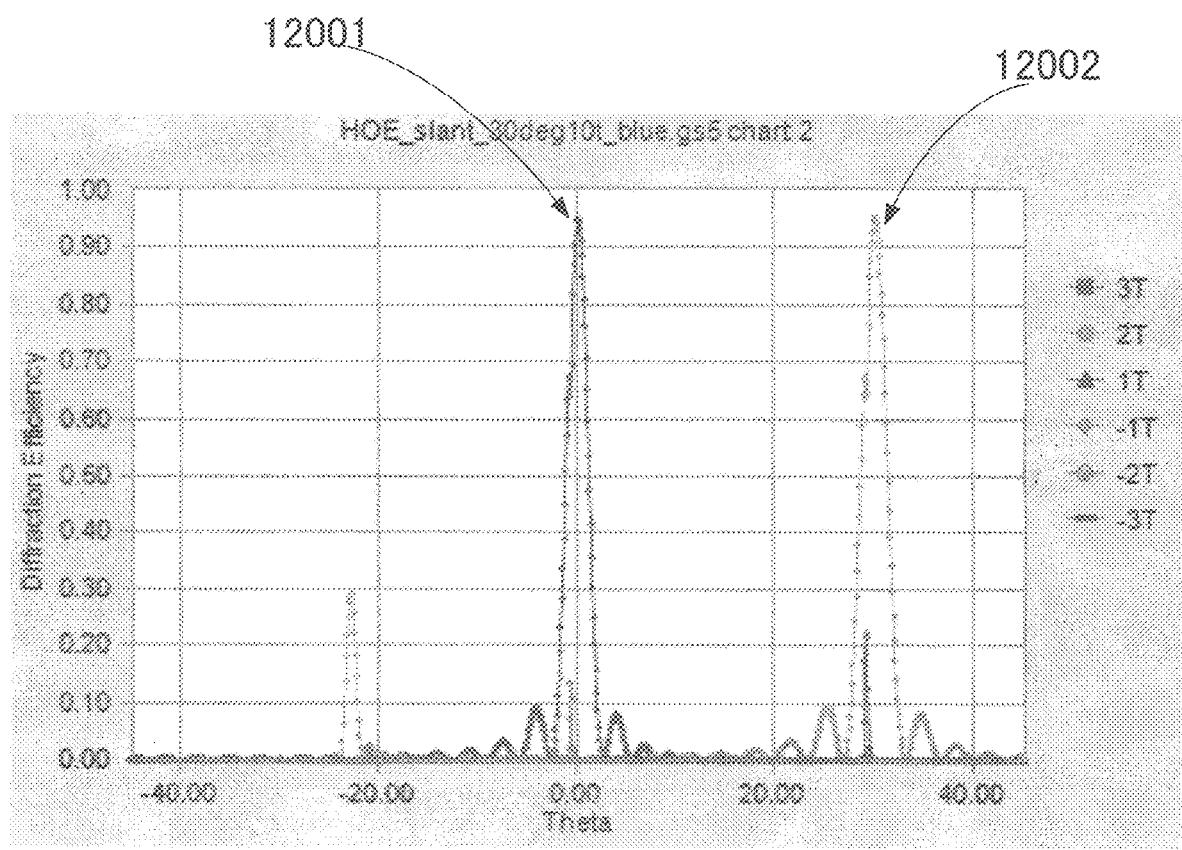
FIG. 12 shows a chart representing the diffraction efficiency of diffracted light.

FIG. 12 shows a chart representing the diffraction efficiency of diffracted light, when blue (0.45 microns) is incident. The value indicates that if the incident angle is 30 degrees, about 95% energy of light is deflected toward −1T or 0 degrees (the normal direction) as shown in FIG. 11. If the incident angle is 0 degrees, about 95% energy of the incident beam is diffracted to 1 T or +30 degrees (although not shown in FIG. 11).

Figure 13:
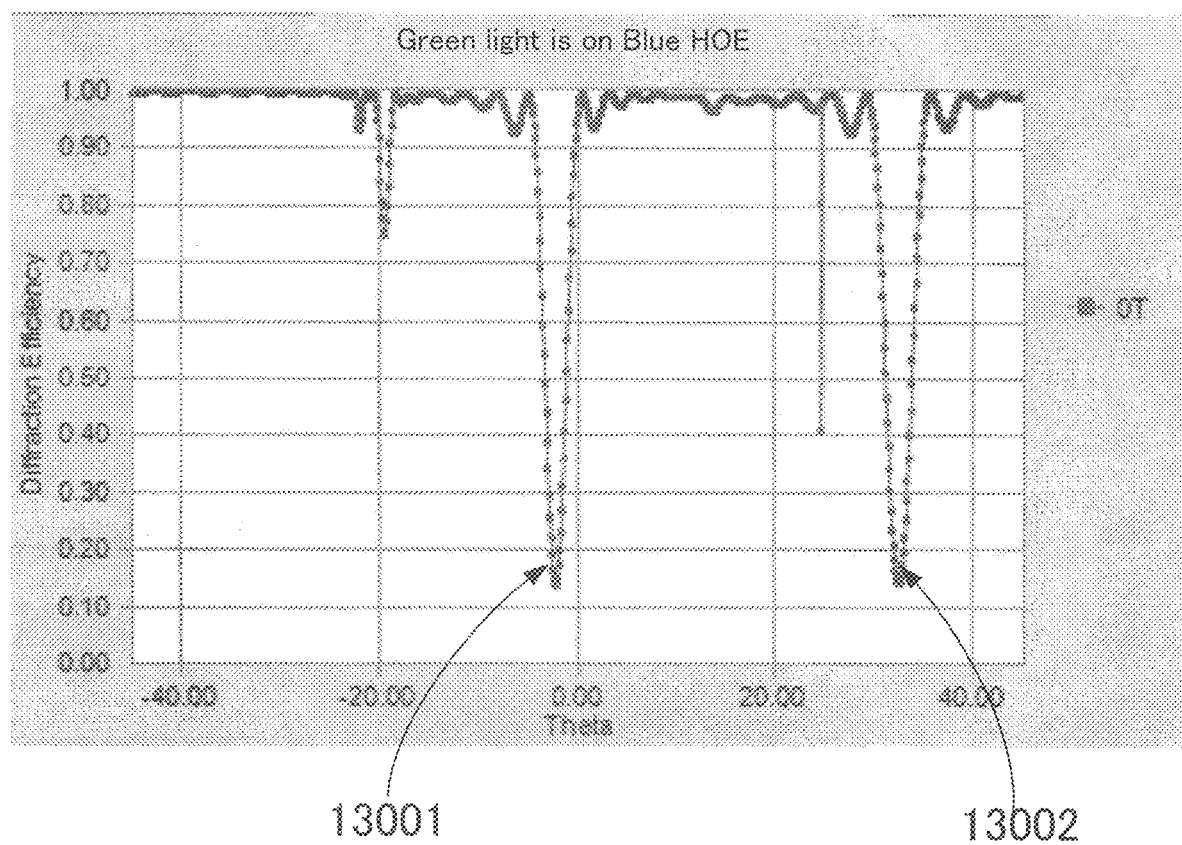
FIG. 13 shows a chart representing the diffraction efficiency of $0^{th}$ order diffraction (straight transmission).

FIG. 13 shows a chart representing the diffraction efficiency of $0^{th}$ order diffraction (=straight transmission), when Green (0.52 microns wavelength) light is incident on the HOE/DOE designed for blue light to diffract from 30 degrees incident to 0 degrees output. This means that if Green light is incident at 10 degrees, the green light will not be diffracted, but goes straight as if it passes a transparent glass pane. In other words, Green light is not affected by the HOE/DOE for blue light to deflect.

Figure 14:
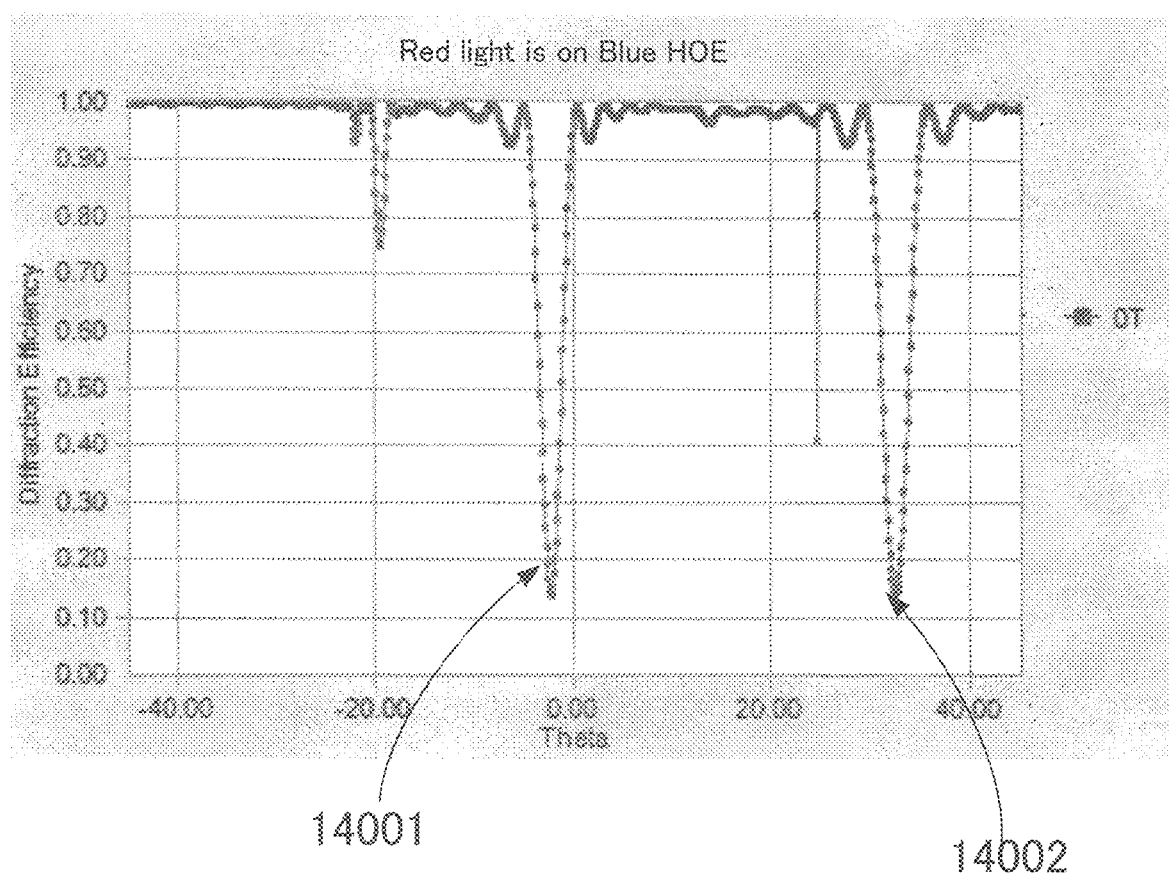
FIG. 14 shows a chart representing the diffraction efficiency of $0^{th}$ order diffraction (straight transmission), when Red (0.638 microns wavelength) light is incident on the HOE/DOE designed for blue light to diffract from 30 degrees incident to 0 degrees output.

FIG. 14 shows a chart representing the diffraction efficiency of $0^{th}$ order diffraction (straight transmission), when Red (0.638 microns wavelength) light is incident on the HOE/DOE designed for blue light to diffract from 30 degrees incident to 0 degrees output. This means that if Red light is incident at −30 degrees, the Red light will not be diffracted, but goes straight as if it passes a transparent glass pane. In other words, Red light is not affected by the HOE/DOE for blue light to deflect.

Figure 15:
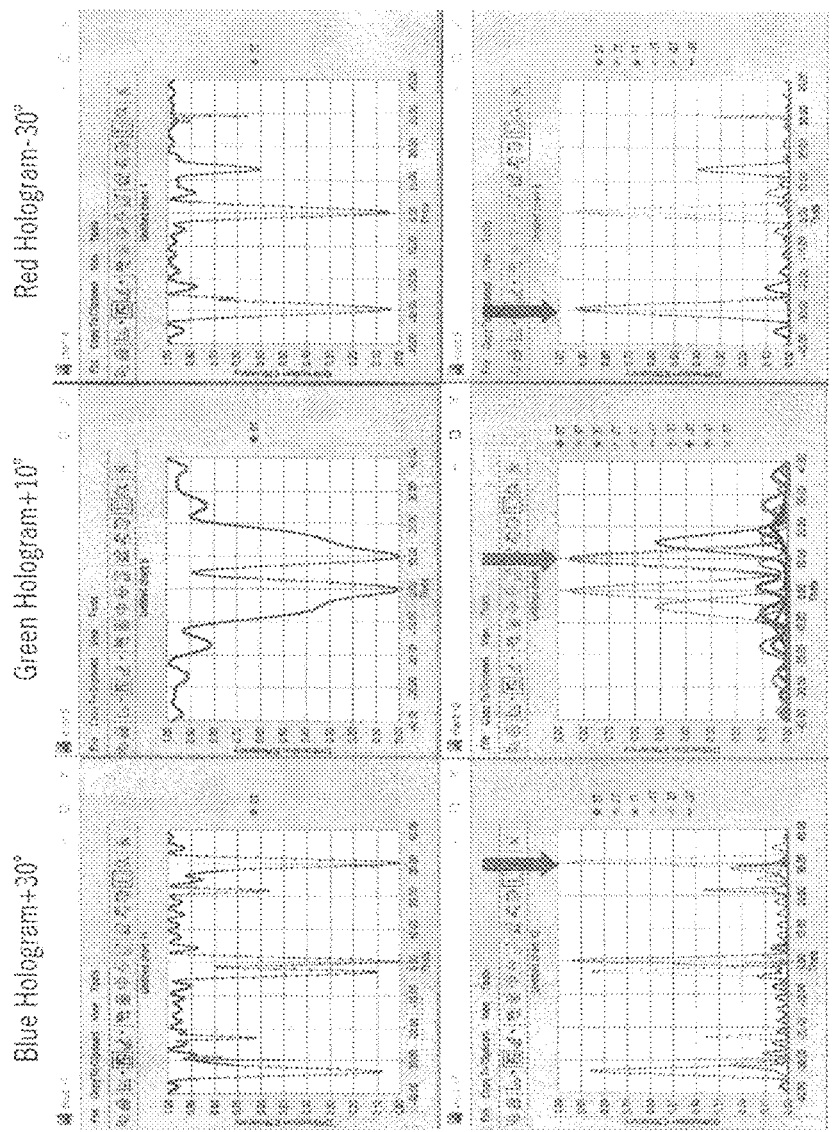
FIG. 15 and FIG. 16 show all possible combinations among three colors (Blue, Green and Red) to see whether the interference among three color beams will take place.
Figure 16:
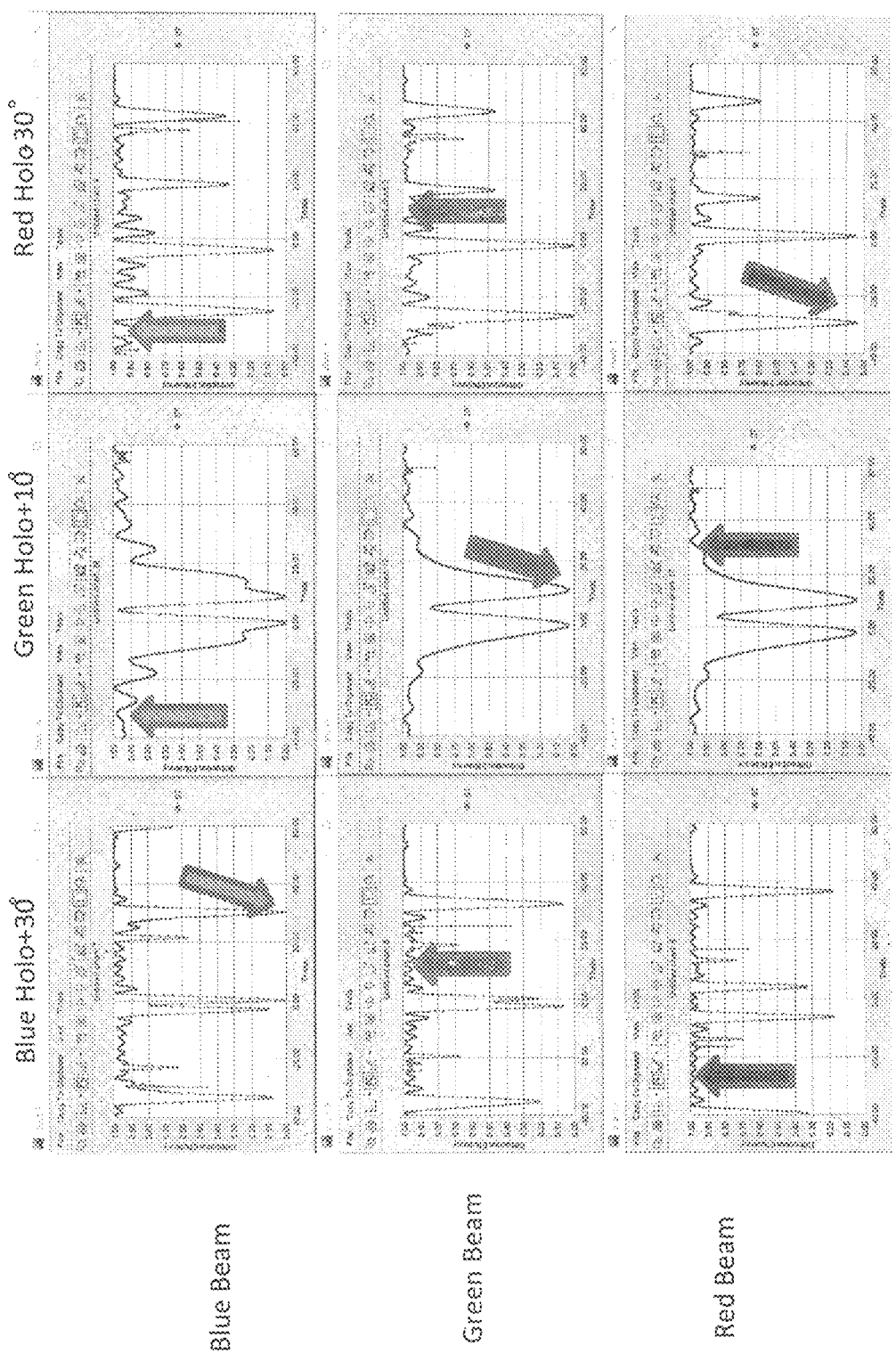

FIG. 15 and FIG. 16 show all possible combinations among three colors (Blue, Green and Red) to see whether the interference among three color beams will take place or not. This example shows no or very low interference among the three colors. This is the reason why three color beams can be integrated from three different incident directions to one single outgoing direction without losing energy or efficiency meaning that three beams into a single beam with very low Etendue is possible to achieve regardless of wavelength and polarization. This was not achievable in the past prior arts.

Figure 17:
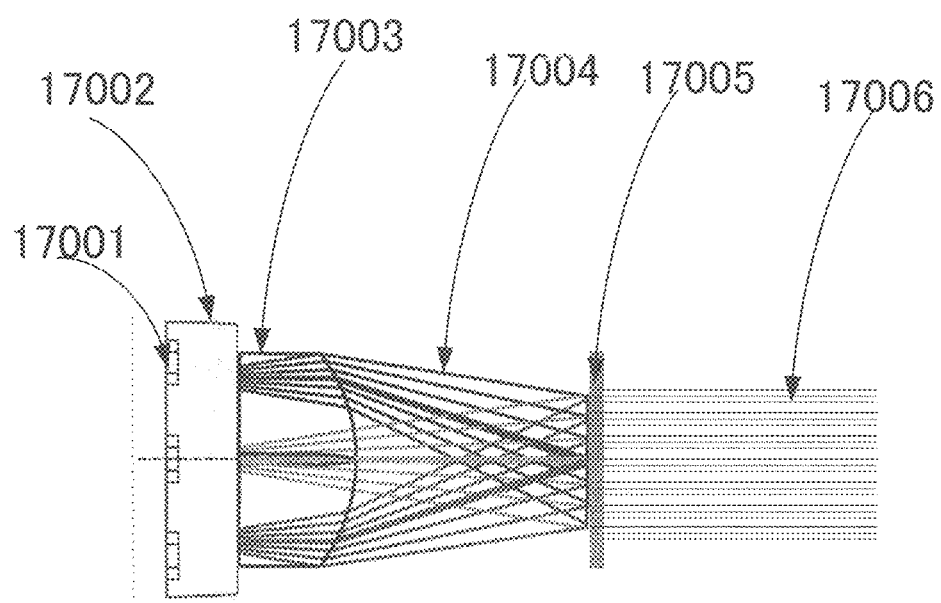
FIG. 17 shows an example of this invention wherein LED light sources emit light and the diverging light are focused on HOE/DOE and diffracted into a parallel beam.

FIG. 17 shows an embodiment of this invention wherein LED light sources (17001) emit light (17003) and the diverging light are focused on HOE/DOE (17005) and diffracted into a parallel beam (17006). The tilt angles of HOE/DOE have to be adjusted by location, meaning the HOE/DOEs are free-form-lenses. This embodiment enables to integrate multiple divergent beams into a single parallel beam. A light source with multiple solid-state light emitting devices (such as Laser or LED, 17001) emitting divergent light beams (1704) which are focused onto a free-form HOE/DOE (17005) and integrated into a single beam by the diffraction of HOE/DOE.

Figure 18:
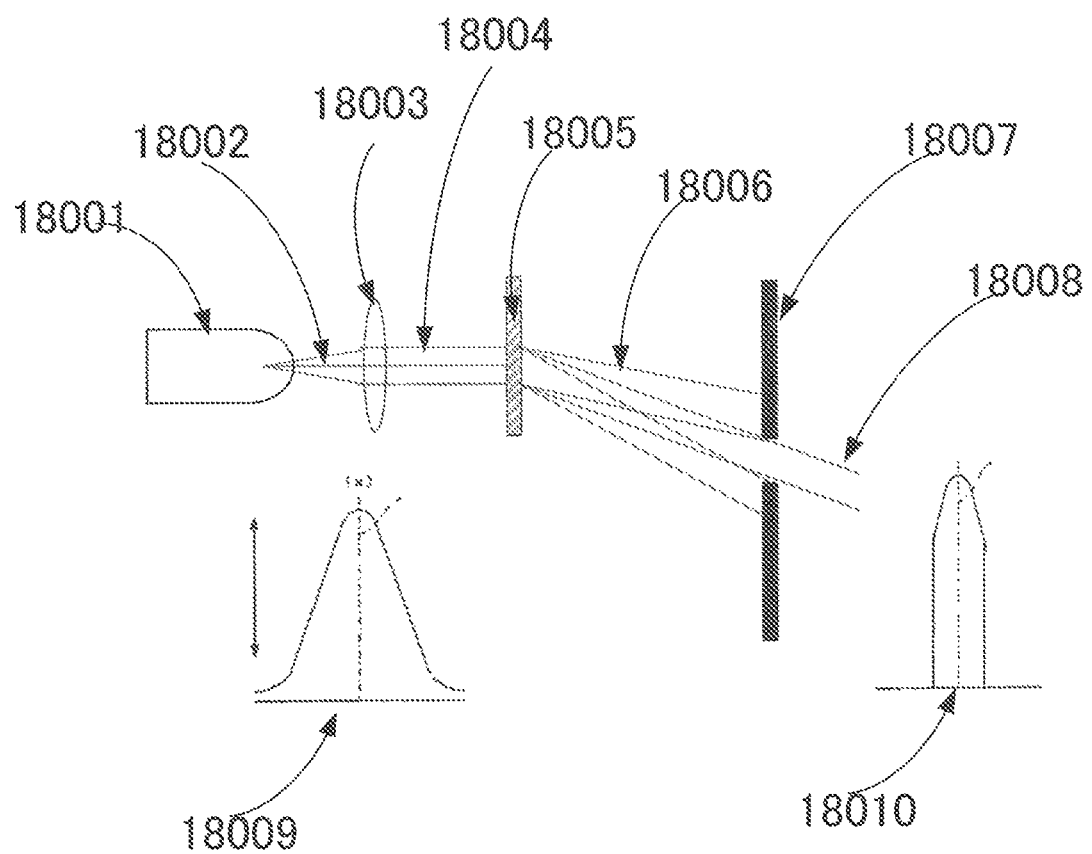
FIG. 18 shows another exemplary embodiment of this invention wherein a solid-state light source and emits a divergent light is collimated by a collimation lens and lead to a HOE/DOE.

FIG. 18 shows an embodiment of this invention wherein a solid state source 18001 emits a divergent light (18002) and it is collimated by a collimation lens (18003) and lead to a HOE/DOE (18005). When the incident light contains wide spectrum of wavelength (18009), the diffraction angle differs by the wavelength, so that only narrow band of spectrum (18010) will go through a slit (18008) and the outgoing beam (18008) will have the narrow spectrum (18010). This embodiment enables to narrower the bandwidth of spectrum of light. Therefore, when a solid-stare light emitting device 18001 emits a divergent light beam containing a wide spectrum of light. The light is collimated by a collimation lens (18003) to a substantially parallel beam and lead to a HOE/DOE which diffracts the beam to a certain direction. The diffraction angle differs depending on the wavelength of the light and the beam after a narrow slit (18007) contains substantially narrower bandwidth of spectrum.

Figure 19:
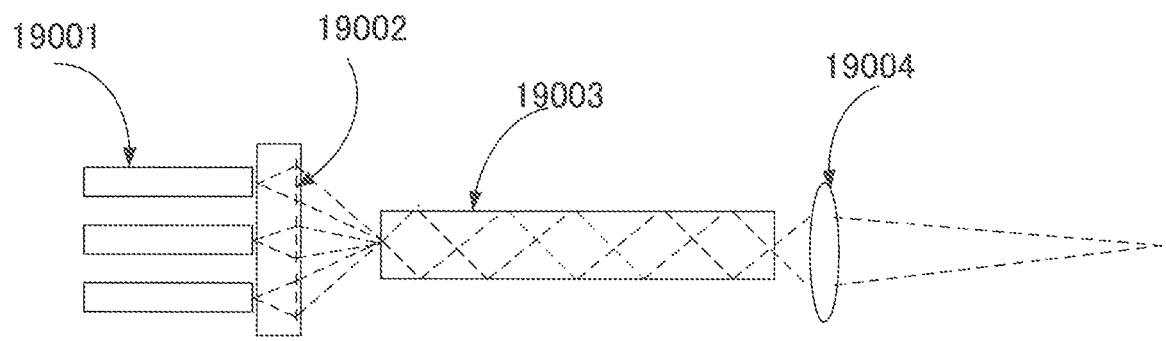
FIG. 19 shows another exemplary embodiment of this invention wherein solid-state light sources emit diverging light beams to enter a HOE/DOE which is designed focus the incident beams into a light pipe wherein the beams are mixed and homogenized.

FIG. 19 shows another exemplary embodiment of this invention wherein a solid-state light sources (19001) emit diverging light beams and enter a HOE/DOE (19002) which is designed focus the incident beams into a light pipe (19003), so that the beams will be mixed to homogenize. This embodiment enables to collect multiple beams into a light pipe with a single HOE/DOE. Specifically, the light emitting devices (19001) emit divergent beams and these beams are focused onto the input window of a light pipe (19003) with a single piece of HOE/DOE.

Figure 20:
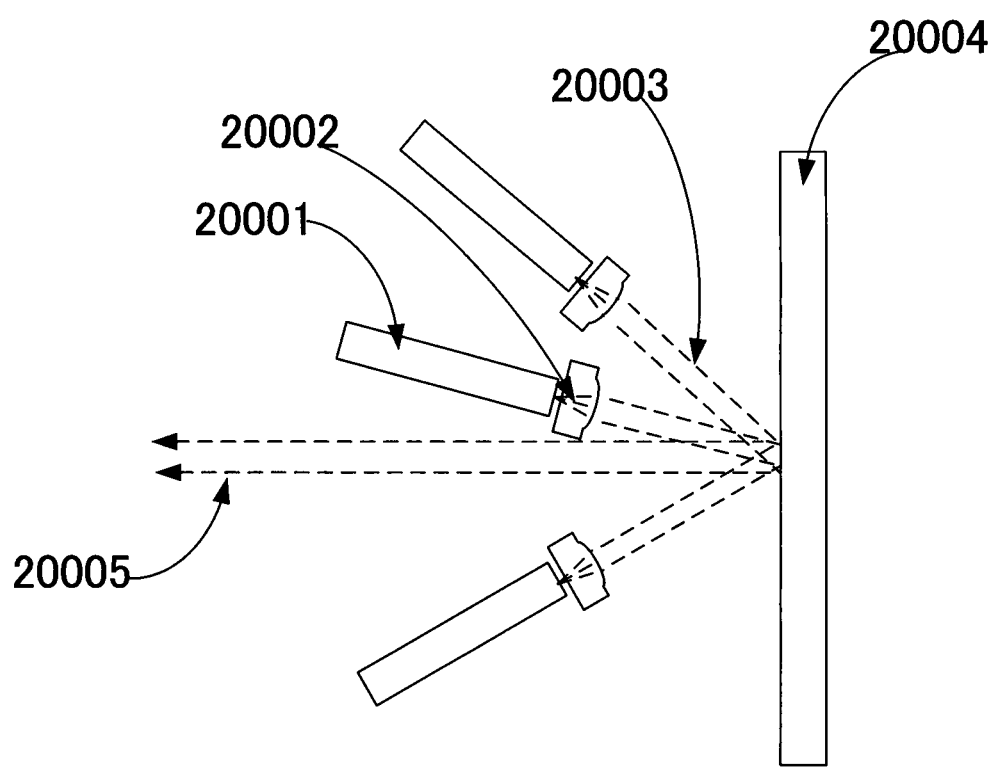
FIG. 20 shows another exemplary embodiment of this invention wherein multiple light beams are integrated into a single beam by a reflective HOE/DOE with multiple light emitting devices emit light beams which are collimated by collimation lenses and lead to the surface of a HOE/DOE and reflected by the HOE/DOE to form a single beam with low Etendue.

FIG. 20 shows an embodiment of this invention. This embodiment enables to integrate multiple light beams (200003) into a single beam by a reflective HOE/DOE (20004). Multiple light emitting devices (20001) emit light beams which are collimated by collimation lenses (20002) and lead to the surface of a HOE/DOE (20004) and reflected by the HOE/DOE to form a single beam with low Etendue.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

We claim:

1. An optical integrator of light beams comprising:
a plurality of light emitting sources each emitting a light beam of different wavelengths along different directions to a diffractive optical element (DOE) having a structure of transparent layers slantly stacked and oriented along an angle relative to a perpendicular normal direction relative a surface of the DOE facing the light beams from the light emitting sources wherein each of the transparent slantly oriented layers having different refractive indices to bend and diffract each of the beams according to a Bragg's diffraction law to a single combined beam projected along a targeted direction; and
wherein the transparent layers slantly stacked and oriented along an angle relative to the, perpendicular normal direction relative the surface of the DOE further comprises multi-layers having at least two different materials with different refractive indices.

2. The integrator of claim 1 wherein:
the light beams emitted from the light emitting sources further comprise at least a blue light beam, a green light beam and a red-light beam.

3. The integrator of claim 1 wherein:
the combined beam is transmitted through the DOE along a direction the perpendicular normal direction relative a surface of the DOE.

4. The integrator of claim 1 further comprising:
a lens for focusing the light beam of a different color along different directions to the DOE wherein the diffractive optical element (DOE) further constitutes a free-form DOE lens wherein the free-form DOE is designed to diffract and integrate the light beam of a different color along different directions into a single parallel beam.

5. The integrator of claim 1 wherein:
the light emitting sources include a solid-state light source emitting the light beam as a divergent light beam to a collimated lens for projecting a collimated beam to the DOE for diffracting the beam as a diffract beam along different diffracting angle depending on the different wavelengths; and
a slit for receiving the diffracted beam from the DOE and projecting an outgoing light from said slit with substantially a narrower bandwidth of the wavelengths than the divergent light beam projected from the solid-state light source.

6. The integrator of claim 1 wherein:
the light emitting sources further comprise light sources selected from a group of light sources consisted of laser, LED and OLED light sources.

7. The integrator of claim 1 wherein:
the DOE wherein the transparent layers slantly stacked and oriented along an anile relative to a perpendicular normal direction relative a surface of the DOE further comprises photopolymer layers each having different refractive indices.

8. The integrator of claim 1 wherein:
the transparent layers slantly stacked and oriented along an angle relative to a perpendicular normal direction relative a surface of the DOE further comprises relief type diffractive layer.

9. The integrator of claim 1 wherein:

the transparent layers slantly stacked and oriented along an angle relative to a perpendicular normal direction relative a surface of the DOE further comprise a reflective coating covering a surface of the DOE facing the light emitting sources for reflecting and reflecting the beams into a single reflected beam.

10. An optical integrator of light beams comprising:

a plurality of light emitting sources each emitting a light beam of a different color along different directions to a diffractive optical element (DOE) having a free-form HOE/DOE wherein the free-form DOE is designed to diffract and focus the beams into a light pipe and wherein the beams are mixed and homogenized to combine the beams for projecting to a single targeted direction; and the DOE further comprises transparent layers slantly stacked and oriented along an angle relative to a perpendicular normal direction relative a surface of the DOE and wherein the transparent layers having at least two different materials with different refractive indices.

\* \* \* \* \*